(12) United States Patent
Abrahamian et al.

(10) Patent No.: US 11,477,651 B2
(45) Date of Patent: Oct. 18, 2022

(54) DETECTING FRAUD RINGS IN MOBILE COMMUNICATIONS NETWORKS

(71) Applicant: AT&T Intellectual Property I, L.P., Atlanta, GA (US)

(72) Inventors: Edmond J. Abrahamian, Richmond Heights, MO (US); Lauren Savage, Santa Clara, CA (US); Surya Murali, Sunnyvale, CA (US); Ana Armenta, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 16/870,871

(22) Filed: May 8, 2020

(65) Prior Publication Data

US 2021/0352482 A1 Nov. 11, 2021

(51) Int. Cl.
| | | |
|---|---|---|
| H04M 1/66 | (2006.01) |
| H04W 12/12 | (2021.01) |
| G06Q 20/40 | (2012.01) |
| H04W 12/06 | (2021.01) |
| H04W 4/24 | (2018.01) |
| H04W 12/69 | (2021.01) |

(52) U.S. Cl.
CPC ........ *H04W 12/12* (2013.01); *G06Q 20/4016* (2013.01); *H04W 4/24* (2013.01); *H04W 12/06* (2013.01); *H04W 12/69* (2021.01)

(58) Field of Classification Search
None
See application file for complete search history.

(56) References Cited

U.S. PATENT DOCUMENTS

| | | | | |
|---|---|---|---|---|
| 6,138,023 A | * | 10/2000 | Agarwal | H04W 8/28 |
| | | | | 379/220.01 |
| 7,458,508 B1 | * | 12/2008 | Shao | G06Q 20/04 |
| | | | | 235/380 |
| 9,626,275 B1 | * | 4/2017 | Hitchcock | G06F 11/3093 |
| 2005/0105467 A1 | * | 5/2005 | True | H04M 15/43 |
| | | | | 370/235 |
| 2010/0087191 A1 | * | 4/2010 | Kocsis | H04W 12/06 |
| | | | | 455/433 |
| 2013/0054334 A1 | * | 2/2013 | Ross | G06Q 30/0225 |
| | | | | 705/14.25 |

(Continued)

*Primary Examiner* — Jinsong Hu
*Assistant Examiner* — Alexander J Yi (57) ABSTRACT

An example method performed by a processing system obtaining a first port-in number for a first mobile device from a first mobile communications service provider, wherein the first port-in number is known to be involved in fraudulent activity, constructing a social graph of communications between the first port-in number and a plurality of other numbers associated with a plurality of other communications devices, identifying, by the processing system, a maximal subgraph of the social graph, wherein the maximal subgraph connects the first port-in number and a subset of the plurality of other numbers that includes those of the plurality of other numbers for which a usage metric is below a predefined threshold for a defined period of time prior to the first port-in number being ported into the first mobile communications service provider, and identifying, by the processing system, a potential fraud ring, based on the maximal subgraph.

19 Claims, 7 Drawing Sheets

(56) References Cited

U.S. PATENT DOCUMENTS

| | | | |
|---|---|---|---|
| 2015/0032761 A1* | 1/2015 | Pasternack | G06F 17/18 |
| | | | 707/748 |
| 2019/0361937 A1* | 11/2019 | Rogynskyy | G06F 11/3452 |
| 2020/0106802 A1* | 4/2020 | Pham | H04L 63/14 |
| 2020/0396616 A1* | 12/2020 | Edman | H04M 17/103 |

* cited by examiner

DETECTING FRAUD RINGS IN MOBILE COMMUNICATIONS NETWORKS

The present disclosure relates generally to fraud detection, and relates more particularly to devices, non-transitory computer-readable media, and methods for detecting fraud rings in mobile communications networks.

BACKGROUND

Fraud costs consumers billions of dollars each year, collectively. Moreover, an individual victim of fraud may spend much time trying to repair the non-financial damage of the fraud, such as replacing credentials and equipment, resetting access to accounts, and the like. For instance, a perpetrator of fraud may gain access to the account password of a mobile phone service subscriber, and may use the password to add himself to the account, to purchase a mobile phone, and/or to make other changes to the account settings. Similar methods may be used to fraudulently obtain other types of goods and services, such as credit cards, Internet service, and the like.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for automatically detecting fraud rings in mobile communications networks. For instance, in one example, a method performed by a processing system including at least one processor includes obtaining a first port-in number for a first mobile device from a first mobile communications service provider, wherein the first port-in number is known to be involved in fraudulent activity, constructing a social graph of communications between the first port-in number and a plurality of other numbers associated with a plurality of other communications devices, identifying, by the processing system, a maximal subgraph of the social graph, wherein the maximal subgraph connects the first port-in number and a subset of the plurality of other numbers that includes those of the plurality of other numbers for which a usage metric is below a predefined threshold for a defined period of time prior to the first port-in number being ported into the first mobile communications service provider, and identifying, by the processing system, a potential fraud ring, based on the maximal subgraph.

In another example, a device includes a processing system including at least one processor and a computer-readable medium storing instructions which, when executed by the processing system, cause the processing system to perform operations. The operations include obtaining a first port-in number for a first mobile device from a first mobile communications service provider, wherein the first port-in number is known to be involved in fraudulent activity, constructing a social graph of communications between the first port-in number and a plurality of other numbers associated with a plurality of other communications devices, identifying, by the processing system, a maximal subgraph of the social graph, wherein the maximal subgraph connects the first port-in number and a subset of the plurality of other numbers that includes those of the plurality of other numbers for which a usage metric is below a predefined threshold for a defined period of time prior to the first port-in number being ported into the first mobile communications service provider, and identifying, by the processing system, a potential fraud ring, based on the maximal subgraph.

In another example, a non-transitory computer-readable medium stores instructions which, when executed by a processing system including at least one processor, cause the processing system to perform operations. The operations include obtaining a first port-in number for a first mobile device from a first mobile communications service provider, wherein the first port-in number is known to be involved in fraudulent activity, constructing a social graph of communications between the first port-in number and a plurality of other numbers associated with a plurality of other communications devices, identifying, by the processing system, a maximal subgraph of the social graph, wherein the maximal subgraph connects the first port-in number and a subset of the plurality of other numbers that includes those of the plurality of other numbers for which a usage metric is below a predefined threshold for a defined period of time prior to the first port-in number being ported into the first mobile communications service provider, and identifying, by the processing system, a potential fraud ring, based on the maximal subgraph.

As discussed above, fraud costs consumers billions of dollars each year, collectively. Moreover, an individual victim of fraud may spend much time trying to repair the non-financial damage of the fraud, such as replacing credentials and equipment, resetting access to accounts, and the like. For instance, a perpetrator of fraud may gain access to the account password of a mobile phone service subscriber, and may use the password to add himself to the account, to purchase a mobile phone, and/or to make other changes to the account settings. Similar methods may be used to fraudulently obtain other types of goods and services, such as credit cards, Internet service, and the like.

Often, the perpetrators of fraud do not work alone, but work together as a team or a "ring." Working together, a fraud ring can inflict much greater losses on its victims than an individual perpetrator working alone. Some fraud rings have developed fairly sophisticated systems for perpetrating fraud. Thus, where a fraud ring is involved, it may not be enough to identify simply one perpetrator; if the other perpetrators are not also identified and stopped, the fraud may continue.

Examples of the present disclosure use social graphs to detect the existence of, and membership in, fraud rings in mobile communications networks. In one example, high risk port-in numbers and/or numbers that are considered to be high risk based on other information (e.g., port-in numbers that are known to be involved in fraudulent activity) are used as seeds to build a social graph. Within the context of the present disclosure, a "port-in number" is understood to be a mobile phone number that a mobile phone service subscriber transfers from a first mobile communications service provider to a second, subsequent mobile communications service provider. In other words, a port-in number is a mobile phone number that a subscriber may take with him even when he changes mobile communications service providers. Furthermore, within the context of the present disclosure, a "social graph" is understood to be a graphical representation of the social connections between mobile phone service subscribers, where nodes represent the subscribers, and links between nodes represent the social connections (e.g., calling relationships) between the subscribers represented by the nodes.

In one example, a high-risk port-in number is a number that is known to be involved in fraudulent activity. In another example, a high-risk number is a number that is suspected to be involved in fraudulent activity (but is not known, for a fact, to be involved in fraudulent activity). In one example, a number that is suspected to be involved in fraudulent activity may be identified based on a usage metric for the number falling below a predefined threshold for a defined period of time prior to port-in. It has been observed that for port-in numbers, for a period of time prior to the actual port-in (e.g., between thirty and ninety days prior to port-in), the usage of phone numbers associated with fraud tends to be significantly lower than the usage of phone numbers not associated with fraud. In other words, if a port-in number is associated with fraud, the usage of the port-in number may be expected to be relatively low for the thirty to ninety days prior to port-in.

In one example, by building a social graph around a high risk port-in number and extending the social graph to a certain number of hops (e.g., at least three hops in some examples), subgraphs that connect subscribers who have previously been identified as high risk (e.g., likely to be involved in fraudulent activities or known to have actually been involved in fraudulent activities, based on a usage metric being below a predefined threshold for a defined period of time prior to port-in of the seed number) can be extracted. These subgraphs may be useful in identifying individuals who are working together as members of fraud rings.

Thus, examples of the present disclosure may be especially useful in detecting the sales of new and/or added mobile phone lines to an existing or newly established mobile phone account, where a port-in number is specified. In such a case, the ported-in numbers may not necessarily be (and usually are not) accounts that are assigned by the current mobile communications service provider (i.e., the service provider to which the numbers are ported). The detected information may be used to protect the accounts and information of legitimate mobile phone service subscribers and/or to alert authorities to the existence and identities of potential fraud rings. Examples of the present disclosure may also be useful in creating a blacklist (or at least specifying an elevated level of risk) for certain port-in numbers. However, it should be understood that examples of the present disclosure may be extended to detect fraud rings in industries other than mobile communications as well; thus, the present disclosure is not limited to the example context described herein. Moreover, it is noted that examples of the present disclosure are able to identify instances of fraud and fraud rings without knowing the actual content of any telecommunications transactions exchanged between members of the fraud ring. In other words, the privacy of the subscribers can be preserved.

Figure 1:
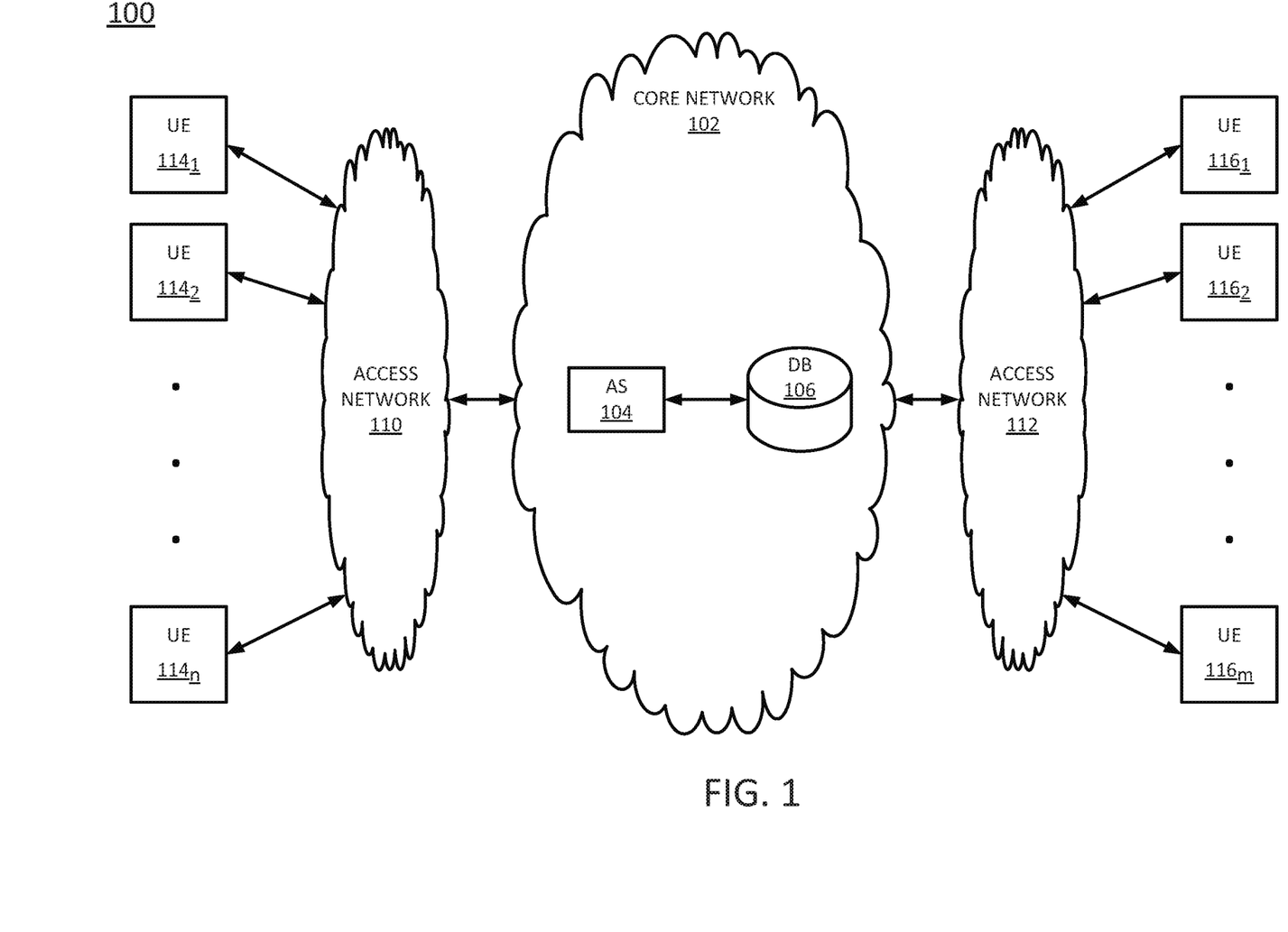
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunications service provider network, a core network, or an enterprise network comprising infrastructure for computing and communications services of a business, an educational institution, a governmental service, or other enterprises. The network 102 may be in communication with one or more access networks 110 and 112, and the Internet (not shown). In one example, network 102 may combine core network components of a cellular network with components of a triple play service network; where triple-play services include telephone services (e.g., wired and/or wireless telephone services), Internet or data services, and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 110 and 112 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 110 and 112. In one example, the access networks 110 and 112 may comprise different types of access networks, may comprise the same type of access network, or some access networks may be the same type of access network and other may be different types of access networks. In one example, the network 102 may be operated by a telecommunications network service provider. The network 102 and the access networks 110 and 112 may be operated by different service providers, the same service provider or a combination thereof, or may be operated by entities having core businesses that are not related to telecommunications services, e.g., corporate, governmental or educational institution LANs, and the like.

In one example, the access network 110 may be in communication with one or more user endpoint devices (also referred to as "endpoint devices" or "UEs") 114$_1$-114$_n$ (hereinafter individually referred to as a "UE 114" or collectively referred to as "UEs 114"), while the access network 112 may be in communication with one or more user endpoint devices 116$_1$-116$_m$ (hereinafter individually referred to as a "UE 116" or collectively referred to as "UEs 116"). Access networks 110 and 112 may transmit and receive communications between respective UEs 114 and 116 and core network 102 relating to communications with web servers, AS 104, and/or other servers via the Internet and/or other networks, and so forth.

In one embodiment, the user endpoint devices 114 and 116 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the user endpoint devices 114 and 116 may have both cellular and non-cellular access capabilities and may further have wired communication and networking capabilities (e.g., such as a desktop computer). In one example, at least some of the UEs 114 and 116 are reachable using unique subscriber numbers (e.g., phone numbers). It should be noted that although only four user endpoint devices are illustrated in FIG. 1, any number of user endpoint devices may be deployed.

Figure 4:
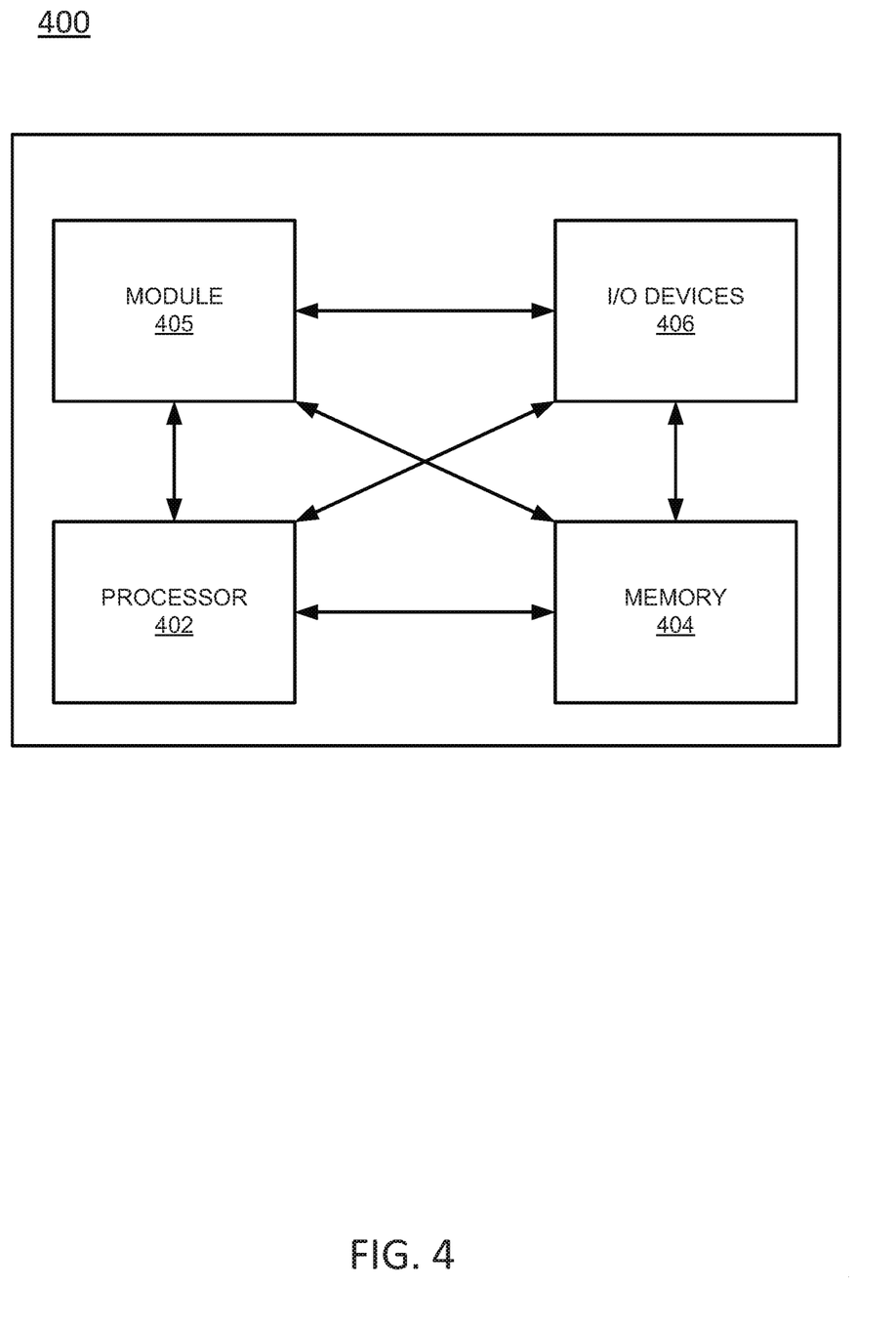
FIG. 4 illustrates a high-level block diagram of a computing device specifically programmed to perform the steps, functions, blocks and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for automatically detecting fraud rings in mobile communications networks. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although a single application server (AS) 104 and a single database (DB) are illustrated, it should be noted that any number of servers may be deployed, and which may operate in a distributed and/or coordinated manner as a processing system to perform operations in connection with the present disclosure.

In one example, AS 104 may comprise a plurality of applications or data processing modules that perform various operations on data stored in the DB 106 and/or on other data. For instance, the AS 104 may host an application that constructs social graphs based on the call data records (CDRs) of mobile phone service subscribers. The application (or another application hosted on the AS 104) may also extract, from the social graphs, subgraphs that may be indicative of the presence of fraud rings in a communications network. The application (or another application hosted on the AS 104) may also include a notification function to alert a service provider and/or the authorities to the presence (and, additionally to the identities of the members) of fraud rings.

In one example, the DB 106 may store CDRs for mobile communications service providers, and/or for providers of another service that is provided at least in part via a communications network. Each CDR that is stored in the DB 106 may contain information (but not the content) associated with one telecommunication transaction (e.g., phone call or text message) that traversed the system 100. For instance, each CDR may include, for a corresponding telecommunication transaction, one or more of the following pieces of information: the phone number associated with the calling party, the phone number associated with the called party, the starting time (e.g., date and time) of the transaction, the duration of the transaction, the phone number that is billed for the transaction, the telephone exchange or equipment writing the CDR, a unique sequence number of the CDR, call type (e.g., voice, short messaging service, or the like), and/or other information.

In a further example, the DB 106 may store social graphs that are constructed by the AS 104 from the CDRs. The social graphs, which are discussed in greater detail below, may illustrate the relationships between different phone numbers that have received and/or originated calls within the system 100.

For ease of illustration, various additional elements of network 102 are omitted from FIG. 1.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 110 and 112, and/or Internet may comprise a content distribution network (CDN) having ingest servers, edge servers, and the like for packet-based streaming of video, audio, or other content. Similarly, although only two access networks, 110 and 112 are shown, in other examples, access networks 110 and/or 112 may each comprise a plurality of different access networks that may interface with network 102 independently or in a chained manner. Thus, these and other modifications are all contemplated within the scope of the present disclosure.

Figure 2:
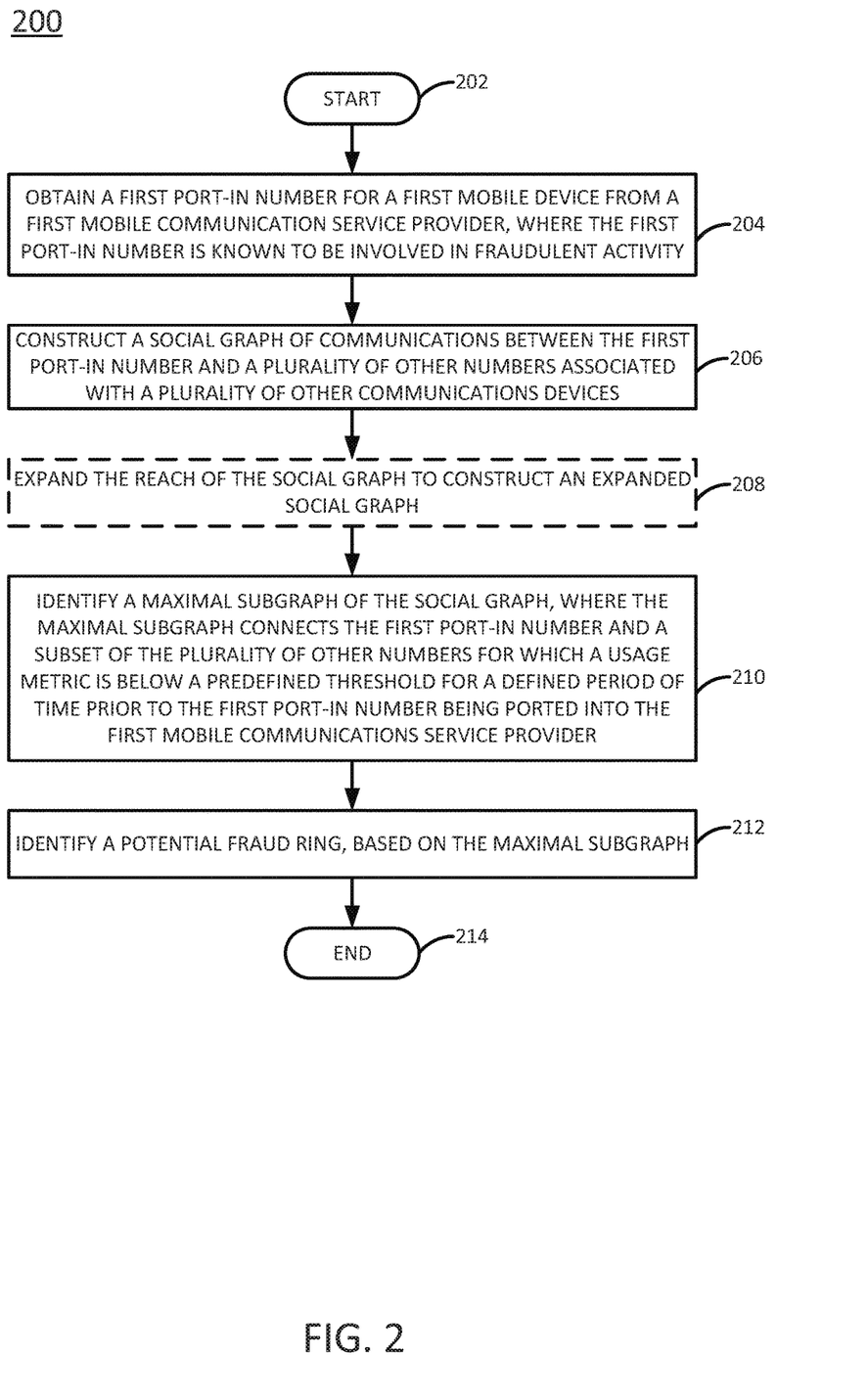
FIG. 2 illustrates a flowchart of an example method for automatically detecting fraud rings in mobile communications networks, in accordance with the present disclosure.

FIG. 2 illustrates a flowchart of an example method 200 for automatically detecting fraud rings in mobile communications networks, in accordance with the present disclosure. In one example, the method 200 is performed by a component of the system 100 of FIG. 1, such as by the AS 104, and/or any one or more components thereof (e.g., a processor, or processors, performing operations stored in and loaded from a memory), or by the AS 104 in conjunction with one or more other devices. In another example, the steps, functions, or operations of method 200 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system.

The method 200 begins in step 202 and may proceed to step 204. In step 204, the processing system may obtain a first port-in number for a first mobile device from a first mobile communications service provider, wherein the first port-in number is known to be involved in fraudulent activity. For instance, the first mobile device may comprise a mobile phone, and the phone number for the first mobile phone may be a number that is being transferred from a second mobile communications service provider to the first mobile communications service provider. The phone number for the first mobile device may be a blacklisted number based on a previous fraudulent activity in which the first mobile device was known to be involved. Alternatively, a second mobile communications service provider from which the phone number for the first mobile device is ported may inform the first mobile communications service provider that the first mobile device was involved in the fraudulent activity.

In step 206, the processing system may construct a social graph of communications between the first port-in number and a plurality of other numbers associated with a plurality of other communications devices (e.g., other mobile devices including mobile phones, landline phones, and other devices). Thus, the first port-in number may comprise a seed for the social graph. In one example, the other communications devices may comprise communications devices with which the first port-in number has exchanged communications within the defined period of time prior to port-in.

In one example, the social graph comprises a plurality of nodes connected by a plurality of edges. In this case, each node represents either the first port-in number or one of the plurality of other numbers associated with the plurality of other communications devices, and each edge represents the social connection between the first port-in number and one of the plurality of other numbers (i.e., the occurrence of a telecommunication transaction between the first port-in number and the one of the plurality of other numbers). Thus, in one example, each edge connects the first port-in number to one of the plurality of other numbers. In one example, the edges may be directed to show which number originated the communication(s) and which number received the communication(s). For instance, an arrowhead on an edge may point to the node associated with the number that received the communication(s).

In one example, the edges may also be weighted by the strength of the social connection. The strength of the social connection may be based on the usage metrics, discussed above (e.g., based on a number of telecommunications transactions between the connected nodes). For instance, the weight of an edge may be proportional to the number of calls between, the durations of calls between, and/or the number of text messages between the first port-in number and the one of the plurality of other numbers to which the edge connects the first port-in number (where, again, the usage metric may be analyzed over the defined period of time). Thus, if the first port-in number exchanged twenty calls with a first number of the plurality of other numbers over the defined time period and three calls with a second number of the plurality of other numbers over the defined time period, then the weight of the edge connecting the first port-in number to the first number may be greater than the weight of the edge connecting the first port-in number to the second number. However, it should be noted that the usage metrics are not limited to measures of counts or durations. For instance, the usage metrics may also include a volume of data (e.g., number of bytes) transferred between numbers (e.g., the first port-in number and the first number).

As an example, Table 1, below, illustrates a set of example phone numbers that may be associated with various mobile communications service providers.

TABLE 1

Example set of phone numbers

| Node Label | Phone Number | Service Provider | Fraudulent? |
|---|---|---|---|
| A | (aaa) aaa-aaaa | Service Provider 2 | Yes |
| B | (bbb) bbb-bbbb | Service Provider 2 | |
| C | (ccc) ccc-cccc | Service Provider 1 | |
| D | (ddd) ddd-dddd | Service Provider 1 | Yes |
| E | (eee) eee-eeee | Service Provider 1 | |
| F | (fff) fff-ffff | Service Provider 3 | |
| G | (ggg) ggg-gggg | Service Provider 4 | Yes |
| H | (hhh) hhh-hhhh | Service Provider 1 | Yes |
| I | (iii) iii-iiii | Service Provider 1 | |
| J | (jjj) jjj-jjjj | Service Provider 1 | Yes |
| K | (kkk) kkk-kkkk | N/A | N/A |

In Table 1, the "node label" field indicates the label of a node in a social graph (e.g., the example social graphs of FIGS. 3A-C, discussed in further detail below). The "phone number" field indicates the phone number of the mobile device indicated by the associated node label. The "service provider" field indicates the mobile communications service provider that provides service to the mobile device (where Service Provider 1 may be the first mobile communications service provider). The "fraudulent" field indicates whether the mobile device is assumed or known to have been used in connection with fraud. For instance, the fraudulent field may indicate "yes" where the phone number is a seed port-in number (e.g., the first port-in number). In some cases, information about the carrier or fraudulent use may be unavailable (N/A).

Figure 3A:
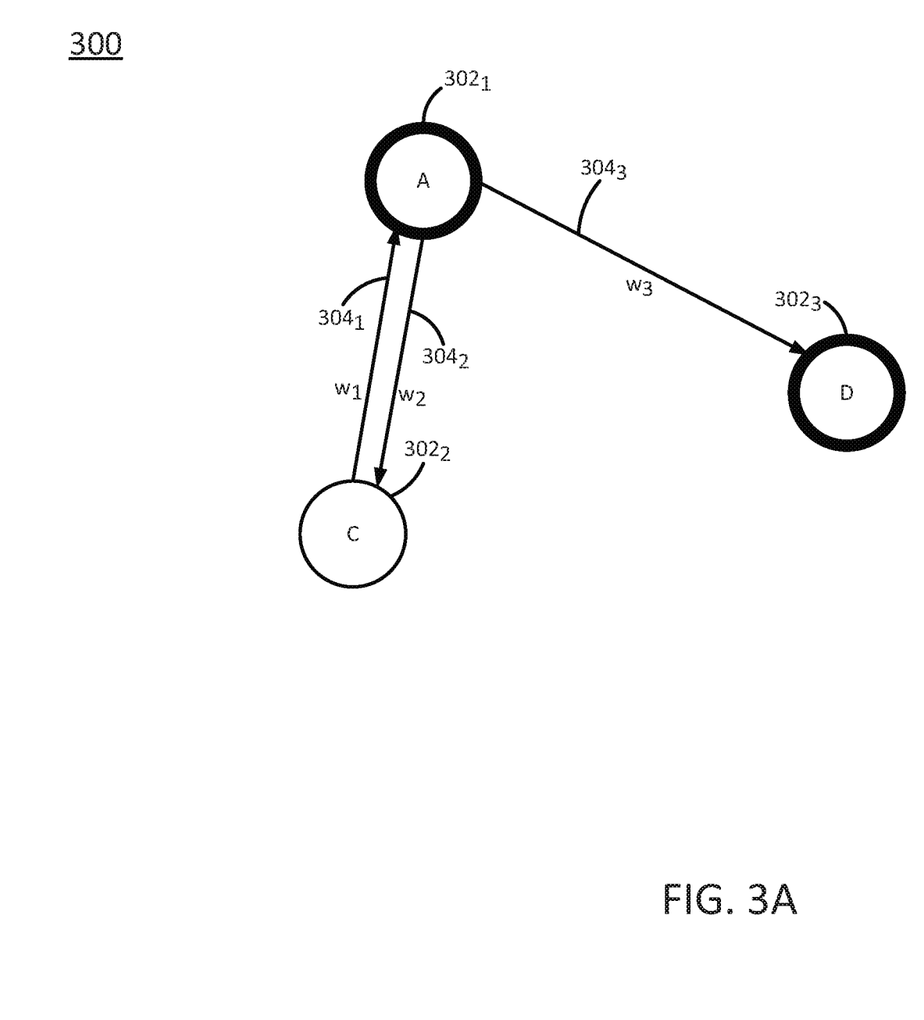
FIG. 3A illustrates an example social graph that may be constructed according to the method of FIG. 2, using the information contained in Table 1.
Figure 3B:
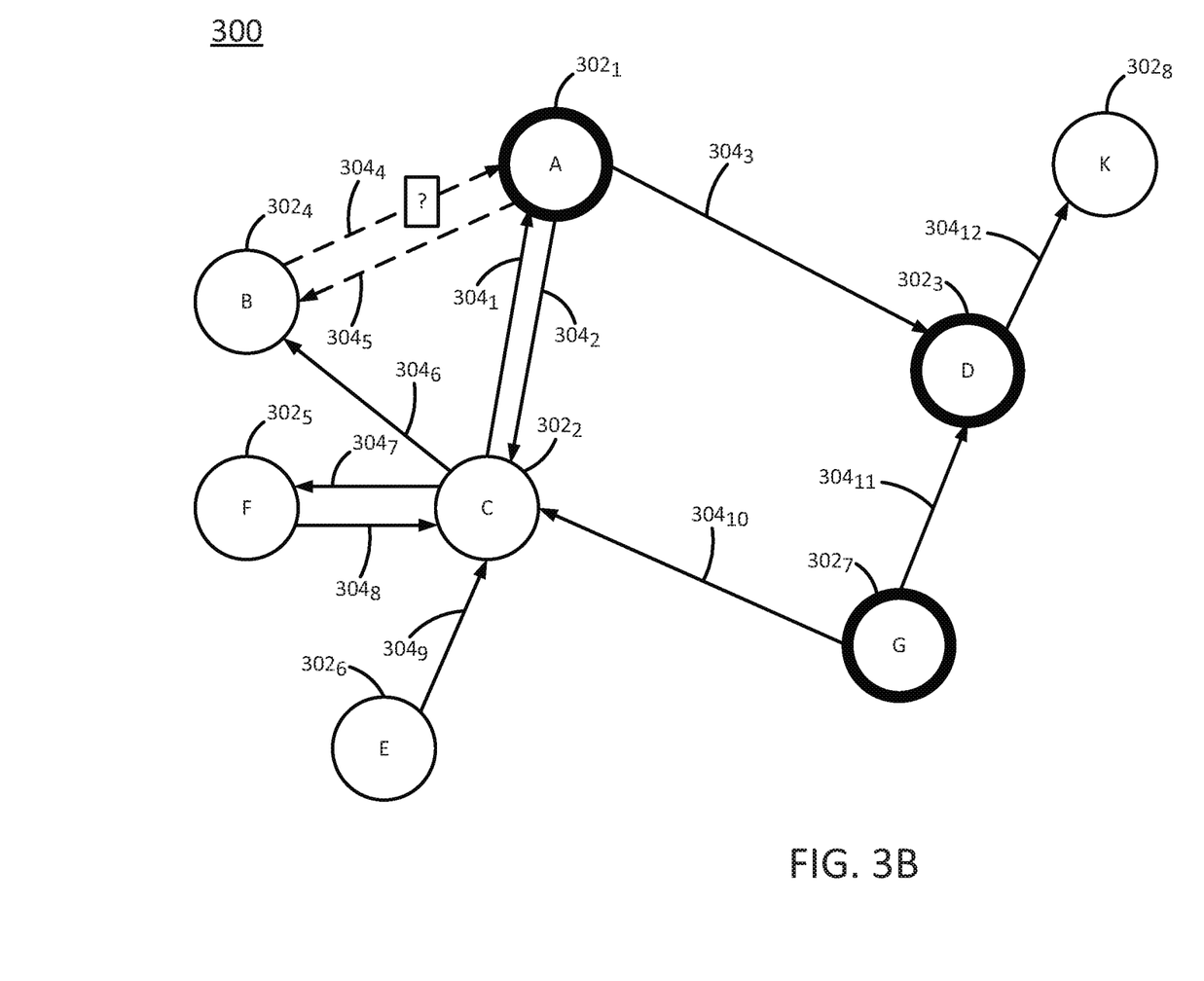
FIG. 3B illustrates the example social graph of FIG. 3A that has been expanded by one hop using the information contained in Table 1.

FIG. 3A illustrates an example social graph 300 that may be constructed according to the method 200 of FIG. 2, using the information contained in Table 1. In one example, the node labeled "A" is the seed number, e.g., the first port-in number. A subsequent search for inbound and outbound communications in which the node labeled "A" was either the calling or called party may show that, within the defined period of time prior to port-in, the devices associated with the node labels "C" and "D" exchanged communications with the device associated with the seed number.

Thus, the example social graph 300 may comprise three nodes $302_1$-$302_3$ (hereinafter individually referred to as a "node 302" or collectively referred to as "nodes 302"), labeled A, C, and D. In this case, based on the information in Table 1, nodes $302_1$ and $302_3$ (labelled A and D) correspond to either seed numbers or to numbers known to be associated with communication devices that have been used in connection with fraudulent activity (or both). In one example, the nodes 302 of the social graph 300 may include some unique visual indication to differentiate which nodes 302 are known to be associated with communication devices that have been used in connection with fraudulent activity. In the example of FIG. 3A, for instance, the nodes $302_1$ and $302_3$ include rings around the nodes. Although not shown in FIG. 3A, the social graph may also include some visual indication to shown which mobile communications service providers are associated with which nodes 302. For instance, if the social graph 300 is a color graph, the nodes 302 may be color coded based on mobile communications service provider (e.g., all nodes 302 corresponding to communications devices that are served by the same mobile communications service provider may be the same color).

As also shown, the example social graph 300 of FIG. 3A includes directed, weighted edges $304_1$-$304_3$ (hereinafter individually referred to as an "edge 304" or collectively referred to as "edge 304"). The edge $304_1$ indicates that at least one telecommunications transaction originated at the node $302_2$ and was received by the node $302_1$; the edge $304_2$ indicates that at least one telecommunications transaction originated at the node $302_1$ and was received by the node $302_2$; and the edge $304_3$ indicates that at least one telecommunications transaction originated at the node $302_1$ and was received by the node $302_3$. Moreover, each edge 304 is assigned a respective weight: the edge $304_1$ is assigned a weight $w_1$; the edge $304_2$ is assigned a weight $w_2$; and the edge $304_3$ is assigned a weight $w_3$.

As illustrated in FIG. 3A, in one example, the social graph is a one-hop network, i.e., a network in which a communication travels from a source to a destination in one hop (or through one edge). Put another way, the social graph may be constructed using only communications that are related directly to the first port-in number (i.e., communications on which the first port-in number was the calling number or the called number). Based on this one-hop network, one can conclude that there is a high likelihood that the communications devices associated with the nodes $302_1$ and $302_3$ are being manipulated by the same person or are being manipulated by different people who are members of the same fraud ring. There is also a possibility that the communications devices associated with the nodes $302_1$ and $302_3$ are being manipulated by different people who are engaged in fraud and who know each other, but who are not necessarily working together as part of a fraud ring. However, in further examples of the method 200, the processing system may perform further steps to differentiate between perpetrators of fraud who have communicated with each other but are working independently, and perpetrators of fraud who have communicated with each other because they are working together.

For instance, referring back to FIG. 2, in optional step 208 (illustrated in phantom), the processing system may recursively expand the reach of social graph 300 that was constructed in step 206, to construct an expanded social graph 300. In one example, the reach of the social graph 300 is expanded by at least one hop. A one-hop network as illustrated in FIG. 3A provides a limited view of the activity of a seed phone number, and this is even more true when the seed phone number is not served by the first mobile communications service provider on whose behalf the social graph 300 may be constructed. For instance, the first mobile communications service provider may not be able to determine, based on a one-hop network, whether the seed phone number was involved in a telecommunications transaction with any phone numbers associated with devices that are not customers of the first mobile communications service provider. However, expanding the social graph by even one hop may increase the amount of useful information that is visible.

To expand the social graph by one hop, the processing system may add nodes 302 and edges 304 for any phone numbers that directly exchanged telecommunications transactions with the existing nodes, i.e., the nodes $302_1$-$302_3$. FIG. 3B, for instance, illustrates the example social graph 300 of FIG. 3A that has been expanded by one hop using the information contained in Table 1.

As illustrated, the example expanded social graph 300 has added the nodes $302_4$-$302_8$ (labelled as B, E, F, G, and K) and the edges $304_4$-$304_{12}$. One of the nodes, i.e., node $302_7$, is visually indicated as high risk according to the scheme described above (and according to the information in Table 1). The edge weights of FIG. 3A have been omitted for simplicity.

Based on the example expanded social graph 300, it is still unclear whether any telecommunications transactions occurred between the seed phone number represented by node $302_1$ (A) and the phone number represented by node $302_4$ (B), as indicated by the dashed lines of the edges $304_4$ and $304_5$. This is because neither of the phone numbers is served by the first mobile communications service provider (i.e., Service Provider 1). However, it can now be seen that nodes $302_2$ and $302_3$ (C and D) have not exchanged any telecommunications transactions (at least during the time period covered by Table 1), since at least one of these nodes (both C and D in this example) are served by the first mobile communications service provider.

Figure 3C:
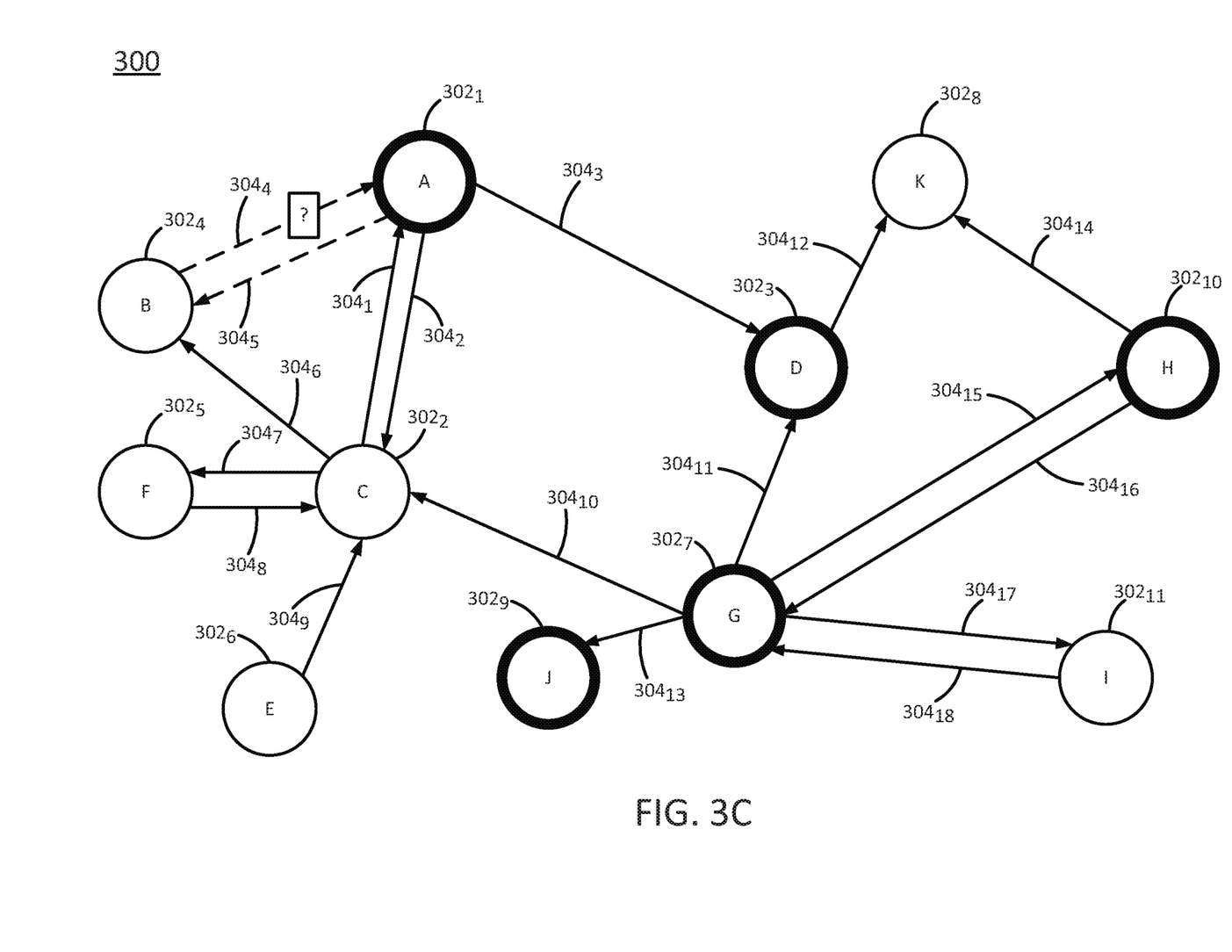
FIG. 3C illustrates the example social graph of FIG. 3A that has been expanded by two hops using the information contained in Table 1.

FIG. 3C illustrates the example social graph 300 of FIG. 3A that has been expanded by two hops (i.e., one hop more than illustrated in FIG. 3B) using the information contained in Table 1. To expand the example expanded social graph 300 by one more hop, the processing system may add nodes 302 and edges 304 for any phone numbers that exchanged telecommunications transactions with the existing nodes, i.e., the nodes $302_1$-$302_8$. As illustrated, the example expanded social graph 300 has added the nodes $302_9$-$302_{11}$ (labelled H, I, and J) and the edges $304_{13}$-$304_{18}$. Two of the nodes, i.e., nodes $302_9$ and $302_{10}$, are visually indicated as high risk according to the scheme described above (and according to the information in Table 1). The edge weights of FIG. 3A have been omitted for simplicity.

Thus, step 206 may add a first subset of nodes to the social graph, while step 208 may add additional (e.g., second and subsequent, as discussed below) subsets of nodes to the social graph.

Based on the example expanded social graph 300, it is still unclear whether any telecommunications transactions occurred between the seed phone number represented by node $302_1$ (A) and the phone number represented by node $302_4$ (B), as indicated by the dashed lines of the edges $304_4$ and $304_5$. This is because, as discussed above, neither of the phone numbers is served by the first mobile communications service provider (i.e., Service Provider 1). However, it can still be seen that nodes $302_2$ and $302_3$ (C and D) have not exchanged any telecommunications transactions (at least during the time period covered by Table 1), since at least one of these nodes (both C and D in this example) are served by the first mobile communications service provider.

Moreover, additional relationships can be discerned. For instance, the degree of node $302_7$ (G), i.e., the number of incoming and outgoing edges (six, in the illustrated example), suggests that the node $302_7$ may be considered an "influencer."

The example expanded social graph 300 may be further expanded in a similar manner by any number of hops. However, the greater the number of hops encompassed by the social graph, the less meaningful the relationships that can be discerned may tend to be. For instance, at a certain number of hops, almost any pair of nodes may be connected to each other somehow, even if the connection is tenuous. Moreover, individual social graphs may become conjoined due to indirect ties. Thus, the choice of how many hops by which to expand the social graph may balance the desire to discover larger fraud rings versus the need to avoid inadvertently connecting unrelated rings due to indirect ties.

Referring back to FIG. 2, in step 210, the processing system may identify a maximal subgraph of the social graph (which may or may not have been expanded by one or more hops according to step 208), where the maximal subgraph connects the first port-in number and a subset of the plurality of other numbers that includes those of the other numbers for which a usage metric is below a predefined threshold for a defined period of time prior to the first port-in number being ported into the first mobile communications service provider (i.e., identified as being likely connected to fraud).

In one example, the usage metric may be at least one of: number of calls (incoming and outgoing) involving the number, durations (e.g., average and/or total) of incoming and outgoing calls involving the number, and number of text messages (incoming and outgoing) involving the number. In one example, the usage metric may be a single one of these metrics. In another example, the usage metric may be an aggregation of these metrics. For instance, the different metrics may be weighted (e.g., the number of calls may be multiplied by a first weight, the durations of the calls may be multiplied by a second weight, and the number of text messages may be multiplied by a third weight), and the weighted metrics may be summed together (e.g., to compute a weighted sum).

As discussed above, it has been observed that, especially for port-in numbers, for a period of time prior to the actual port-in, the usage of phone numbers associated with fraud tends to be significantly lower than the usage of phone numbers not associated with fraud. In other words, if a port-in number is associated with fraud, the usage of the port-in number may be relatively low for the period of time prior to port-in. Thus, at least some of the other numbers in the subset may also be port-in numbers. In one example, the defined period of time over which the usage metrics are analyzed is between thirty and ninety days prior to port-in.

Figure 3D:
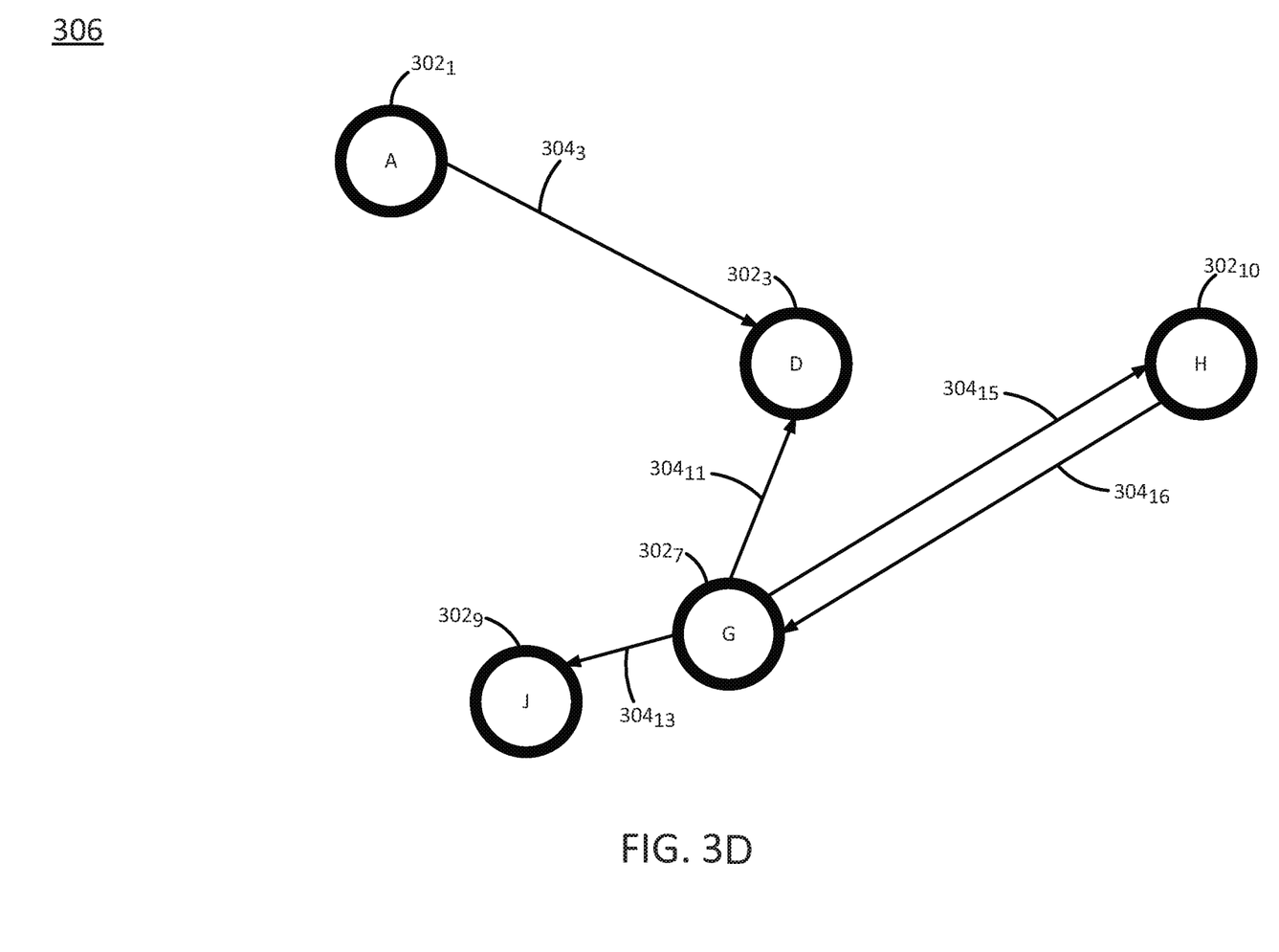
FIG. 3D illustrates an example maximal subgraph that may be extracted from the example expanded social graph of FIG. 3C.

FIG. 3D illustrates an example maximal subgraph 306 that may be extracted from the example expanded social graph 300 of FIG. 3C. As illustrated, the example maximal subgraph 306 connects all of the high risk nodes $302_1$, $302_3$, $302_7$, $302_9$, and $302_{10}$ (A, D, G, J, and H) in the example expanded social graph 300 (as well as the edges connecting these high risk nodes) and omits the remaining nodes 302 (and edges 304). Thus, the maximal subgraph comprises a small network of interconnected nodes, where all of the nodes in the maximal subgraph share the property of being high risk (e.g., likely connected to fraud).

In step 212, the processing system may identify a potential fraud ring, based on the maximal subgraph. In one example, the entirety of the maximal subgraph may represent the potential fraud ring. That is, all of the nodes that are connected by the maximal subgraph may be considered potential participants in a common fraud ring. In another example, a portion of the maximal subgraph (e.g., a subset of the nodes in the maximal subgraph) may be considered potential participants in a fraud ring. For instance, the minimum threshold may be imposed on the weights of the edges connecting the nodes of the maximal subgraph, and a node may be considered a potential participant in the fraud ring only if the weight of the edge connecting the node to another node in the fraud ring at least meets the minimum threshold. Optionally, the processing system may also identify in step 212 a possible leader or coordinator of the potential fraud ring, based on the maximal subgraph. For instance, as discussed in connection with the example maximal subgraph 306 of FIG. 3D, the node of the maximal subgraph having the highest degree (e.g., the most connections to other nodes in the maximal subgraph) may be considered the leader or influencer of the potential fraud ring.

In one example, the potential fraud ring identified in step 212 may be expanded to consider nodes that are outside of the maximal subgraph. For instance, in one example, a node in the expanded social graph that is not indicated as high risk may be added to the potential fraud ring if the usage pattern of the node is similar to the usage pattern used to define high risk port-in numbers (e.g., a usage metric for the phone number associated with the node is below a predefined threshold for a defined period of time prior to the port-in of the first port-in number). Any nodes meeting the usage pattern criteria that are also served by the first mobile communications service provider may have an even higher confidence of being connected to the potential fraud ring, since the first mobile communications service provider will have greater visibility into the activities of these nodes.

The method 200 may end in step 214.

It should be noted that the method 200 may be run simultaneously for a plurality of seed numbers (e.g., port-in numbers that are known to be fraudulent). In this case, the method 200 will generate a plurality of maximal subgraphs (e.g., as described in step 210), where the plurality of subgraphs will not necessarily be related. The plurality of subgraphs may represent a plurality of potential fraud rings (which, again, are not necessarily related). Thus, the method 200 may be run wholesale for a plurality of seed numbers in practice, as opposed to being run for one seed number at a time.

Once the processing system has identified a potential fraud ring, there are a number of further actions that the processing system may take. For instance, in one example, the processing system may temporarily suspend service to any members (e.g., devices or phone numbers) of the potential fraud ring who are served by the first mobile communications service provider. The suspension of service may include, for example, blocking calls and text messages (incoming and/or outgoing). Calls and text messages may be blocked to all non-emergency numbers (e.g., all numbers except for 911), to all other numbers that are identified as members of the potential fraud ring, or to other groups of numbers. Temporary suspension of service may allow individuals whose numbers have been incorrectly identified as members of a potential fraud ring to restore service upon completing some sort of verification process.

In a further example, the processing system may also notify the mobile communications service providers who serve the other members of the potential fraud ring (i.e., the members not served by the first mobile communications service provider) of the numbers associated with those other members. The mobile communications service providers may similarly elect to suspend service to these other members. In some cases, the phone numbers associated with the potential fraud ring may also be provided to law enforcement agencies.

Furthermore, although the method 200 discussed using a port-in number as the seed for the social graph, in other examples, any high risk number (e.g., a phone number that has already been identified as potentially connected to fraud or is known to actually be connected to fraud, or a phone number for which a usage metric is below a predefined threshold for a defined period of time) may be used as the seed.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 208-210. In another example, the method 200 may include storing one or more digital objects, e.g., in a database or at the edge server. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the method 200, may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for automatically detecting fraud rings in mobile communications networks, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), a graphics processing unit (GPU), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for automatically detecting fraud rings in mobile communications networks (e.g., a software program comprising computer-executable instructions) can be loaded into memory 404 and executed by hardware processor element 402 to implement the steps, functions or operations as discussed above in connection with the example method (s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for automatically detecting fraud rings in mobile communications networks (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system that includes at least one processor, a first port-in number for a first mobile device from a first mobile communications service provider, wherein the first port-in number is assumed to be involved in fraudulent activity based on a usage metric for the first port-in number falling below a predefined threshold for a defined period of time prior to the first port-in number being ported into the first mobile communications service provider;
constructing, by the processing system, a social graph of communications between the first port-in number and a plurality of other numbers associated with a plurality of other communications devices,
wherein the social graph comprises:
a plurality of nodes,
wherein each node of the plurality of nodes represents the first port-in number or one of the plurality of other numbers; and
a plurality of edges,
wherein each edge of the plurality of edges indicates an occurrence of a telecommunications transaction between a pair of nodes of the plurality of nodes that is connected by the edge;
identifying, by the processing system, a maximal subgraph of the social graph, wherein the maximal subgraph connects the first port-in number and a subset of the plurality of other numbers that includes those of the plurality of other numbers for which the usage metric is below the predefined threshold for the defined period of time prior to the first port-in number being ported into the first mobile communications service provider; and
identifying, by the processing system, a potential fraud ring, based on the maximal subgraph.

2. The method of claim 1, wherein the usage metric comprises a number of calls involving a corresponding number of the subset.

3. The method of claim 1, wherein the usage metric comprises an average duration of calls involving a corresponding number of the subset.

4. The method of claim 1, wherein the usage metric comprises a number of text messages involving a corresponding number of the subset.

5. The method of claim 1, wherein the usage metric comprises a weighted sum of a plurality of usage metrics.

6. The method of claim 1, wherein the defined period of time is between thirty and ninety days.

7. The method of claim 1, wherein each edge is weighted according to a strength of a connection between the pair of nodes.

8. The method of claim 7, wherein the strength of the connection is a measure of a number of telecommunications transactions.

9. The method of claim 1, wherein a subset of the plurality of nodes that corresponds to those of the plurality of other numbers for which the usage metric is below the predefined threshold for the defined period of time is provided with a unique visual indicator.

10. The method of claim 1, wherein the constructing the social graph comprises:
constructing, by the processing system, a one-hop network, wherein the one-hop network includes a first subset of the plurality of nodes, and wherein nodes in the first subset correspond to the first port-in number and to those of the plurality of other numbers that have directly exchanged a telecommunications transaction with the first port-in number over the defined period of time; and
expanding, by the processing system, the one-hop network by at least one additional hop by adding a second subset of the plurality of nodes, wherein nodes in the second subset correspond to those of the plurality of other numbers that have directly exchanged a telecommunications transaction with numbers corresponding to the first subset over the defined period of time.

11. The method of claim 10, wherein the potential fraud ring comprises an entirety of the maximal subgraph.

12. The method of claim 10, wherein the potential fraud ring comprises a portion of the maximal subgraph.

13. The method of claim 12, wherein the portion comprises those nodes of the maximal subgraph for which a weight of a connected edge at least meets a minimum threshold.

14. The method of claim 1, further comprising:
identifying, by the processing system, a leader of the potential fraud ring, based on the maximal subgraph.

15. The method of claim 14, wherein the leader corresponds to a node of the maximal subgraph to which a maximum number of edges of the plurality of edges is connected.

16. The method of claim 1, further comprising:
suspending, by the processing system, a telecommunications service to at least one of: the first port-in number or the subset of the plurality of other numbers.

17. The method of claim 1, further comprising:
notifying, by the processing system, a second mobile communications service provider of a presence of at least one number of: the first port-in number or the subset of the plurality of other numbers, wherein the at least one number is a number that is served by the second mobile communications service provider.

18. A device comprising:
a processing system that includes at least one processor; and
a computer-readable medium storing instructions which, when executed by the processing system, cause the processing system to perform operations, the operations comprising:
obtaining a first port-in number for a first mobile device from a first mobile communications service provider, wherein the first port-in number is assumed to be involved in fraudulent activity based on a usage metric for the first port-in number falling below a predefined threshold for a defined period of time prior to the first port-in number being ported into the first mobile communications service provider;
constructing a social graph of communications between the first port-in number and a plurality of other numbers associated with a plurality of other communications devices, wherein the social graph comprises:

a plurality of nodes, wherein each node of the plurality of nodes represents the first port-in number or one of the plurality of other numbers; and a plurality of edges, wherein each edge of the plurality of edges indicates an occurrence of a telecommunications transaction between a pair of nodes of the plurality of nodes that is connected by the edge;

identifying a maximal subgraph of the social graph, wherein the maximal subgraph connects the first port-in number and a subset of the plurality of other numbers that includes those of the plurality of other numbers for which the usage metric is below the predefined threshold for the defined period of time prior to the first port-in number being ported into the first mobile communications service provider; and identifying a potential fraud ring, based on the maximal subgraph.

19. A non-transitory computer-readable medium storing instructions which, when executed by a processing system including at least one processor, cause the processing system to perform operations, the operations comprising:

obtaining a first port-in number for a first mobile device from a first mobile communications service provider, wherein the first port-in number is assumed to be involved in fraudulent activity based on a usage metric for the first port-in number falling below a predefined threshold for a defined period of time prior to the first port-in number being ported into the first mobile communications service provider;

constructing a social graph of communications between the first port-in number and a plurality of other numbers associated with a plurality of other communications devices, wherein the social graph comprises:

a plurality of nodes, wherein each node of the plurality of nodes represents the first port-in number or one of the plurality of other numbers; and a plurality of edges, wherein each edge of the plurality of edges indicates an occurrence of a telecommunications transaction between a pair of nodes of the plurality of nodes that is connected by the edge;

identifying a maximal subgraph of the social graph, wherein the maximal subgraph connects the first port-in number and a subset of the plurality of other numbers that includes those of the plurality of other numbers for which the usage metric is below the predefined threshold for the defined period of time prior to the first port-in number being ported into the first mobile communications service provider; and identifying a potential fraud ring, based on the maximal subgraph.

* * * * *